United States Patent [19]

Playe

[11] Patent Number: 4,723,137

[45] Date of Patent: Feb. 2, 1988

[54] RECTO-VERSO INDIRECT ELECTROSTATIC PRINTER

[75] Inventor: Patrice Playe, Houilles, France

[73] Assignee: La Telephonie Industrielle et Commerciale Telic Alcatel, Strasbourg, France

[21] Appl. No.: 923,927

[22] Filed: Oct. 28, 1986

[30] Foreign Application Priority Data

Oct. 28, 1985 [FR] France ................................ 85 15977

[51] Int. Cl.4 ............................................ G01D 15/00

[52] U.S. Cl. ................................ 346/153.1; 346/105; 346/160.1

[58] Field of Search ...................... 346/153.1, 105, 134, 346/160.1; 355/14 SH, 3 R, 24; 271/213, 272, 275; 400/119, 149, 624–626, 629; 101/DIG. 13

[56] References Cited

U.S. PATENT DOCUMENTS

| | | | |
|---|---|---|---|
| 3,775,102 | 11/1973 | Punnet | 346/153.1 |
| 3,936,171 | 2/1976 | Brooke | 346/153.1 |
| 3,983,815 | 10/1976 | Borelli | 346/153.1 |
| 4,427,285 | 1/1984 | Stange | 355/24 |

FOREIGN PATENT DOCUMENTS

| | | | |
|---|---|---|---|
| 0091074 | 10/1985 | European Pat. Off. | 346/153.1 |
| 1590872 | 6/1981 | United Kingdom | 346/153.1 |

*Primary Examiner*—Arthur G. Evans
*Attorney, Agent, or Firm*—Sughrue, Mion, Zinn, Macpeak, and Seas

[57] ABSTRACT

An electrostatic printer uses a dielectric film (10) as an intermediate recording medium for an electrostatic latent image which is to be printed on a final recording medium (1) such as sheets of paper. The latent image is first developed by inking, and the inked image is then fixed on the final medium by pressure using a transfer unit having pressure rolls (11A, 11B) between which the intermediate medium and the final medium are passed while pressed against each other. Two portions of the same dielectric film are pressed against opposite faces of the final medium as it passes between the pressure rolls of the transfer unit with each portion being suitable for receiving an electrostatic latent image from a corresponding write head (8) with images being inked by corresponding inking devices (9), and with each inking device being associated with a corresponding different one of the rolls of the transfer unit.

4 Claims, 2 Drawing Figures

RECTO-VERSO INDIRECT ELECTROSTATIC PRINTER

The present invention relates to indirect electrostatic printers using an intermediate recording film medium for receiving an electrostatic latent image which is to be printed, and a final recording medium for receiving the latent image as developed by inking and as fixed thereon by pressure. The invention relates more particularly to printers enabling recto and verso printing to be performed on a common final medium in a single operation using one intermediate recording film medium.

BACKGROUND OF THE INVENTION

These films are flexible and are constituted by a thin dielectric strip, made of polyester, for example, which is stored in roll form in a printer.

A latent electrostatic image is made up of ions deposited on one face of the intermediate film medium by selective electric discharge onto a zone of the film passing between a multitude of miniature print electrodes and adjacent counter-electrodes. The electrodes are usually distributed in one or more parallel rows and the counterelectrodes are usually disposed either opposite the electrodes and on the other side of the intermediate film medium, or else running alongside the electrodes and on the same side of the said intermediate film medium as the electrodes in a zone where electric discharge takes place.

The latent image is developed by inking it using liquid or powder ink particles which are electrically attracted to the electrostatic charges conveyed on the facing face of the intermediate film medium.

The inked face of the moving film is then locally pressed against one of the faces of a final recording medium in a transfer unit so as to transfer particles of ink to the final medium, with the ink particles being fixed on the final medium by the application of mechanical pressure which ensures close contact between the intermediate medium and the final medium.

The final recording medium is preferably a commonly-available and cheap medium of ordinary quality, for example a conventional non-coated paper. The image is formed at very high speed, typically about ten microseconds per point or per set of simultaneously formed points.

Since such printers must be capable of being installed in a wide variety of premises, and generally in non-specialized premises such as in offices where they may be simply stood on a table, it is important for such printers to be compact, silent, fast, and easy to operate by a wide variety of users who are not only untrained, but who may well also be clumsy.

In particular, there is a need for printers capable of printing on both sides of the final recording medium (i.e. of "duplex" or of "recto-verso" printing) in a single operation, at least so far the user is concerned.

SUMMARY OF THE INVENTION

The present invention provides an electrostatic printer employing a dielectric film as an intermediate recording medium for receiving an electrostatic latent image which is to be printed on a final recording medium, said latent image being received from an electrostatic write head constituted by a set of aligned print electrodes and associated counterelectrodes, said final recording medium (e.g. sheets of paper) being intended to receive the electrostatic latent image after it has been developed by means of an inking device, and said inked image being fixed on said final recording medium by the application of high pressure with said intermediate and final recording media being pressed against each other in a transfer unit by means of pressure transfer rolls with said intermediate and final media passing simultaneously therebetween after the intermediate recording medium has been inked, said printer including the improvement whereby said final recording medium is pressed between two portions of a single dielectric film passing successively over each of the two rolls of the transfer unit with a different face of the intermediate medium being pressed against each of said rolls, thereby enabling two different zones on opposite faces of the dielectric film to simultaneously receive respective electrostatic latent images and to be simultaneously inked, with said inked images being simultaneously transferred to the recto and verso faces of a common final recording medium from two portions of the dielectric film which are situated at a distance apart from each other along said film and which are situated on opposite faces thereof, each of said two portions being suitable for being electrostatically charged by a write head attributed thereto and inked by an inking device likewise attributed thereto, and each of said inking devices associated with a different one of the transfer rolls of the transfer unit.

BRIEF DESCRIPTION OF THE DRAWINGS

Embodiments of the invention are described by way of example with reference to the accompanying drawings, in which.

MORE DETAILED DESCRIPTION

Figure 1:
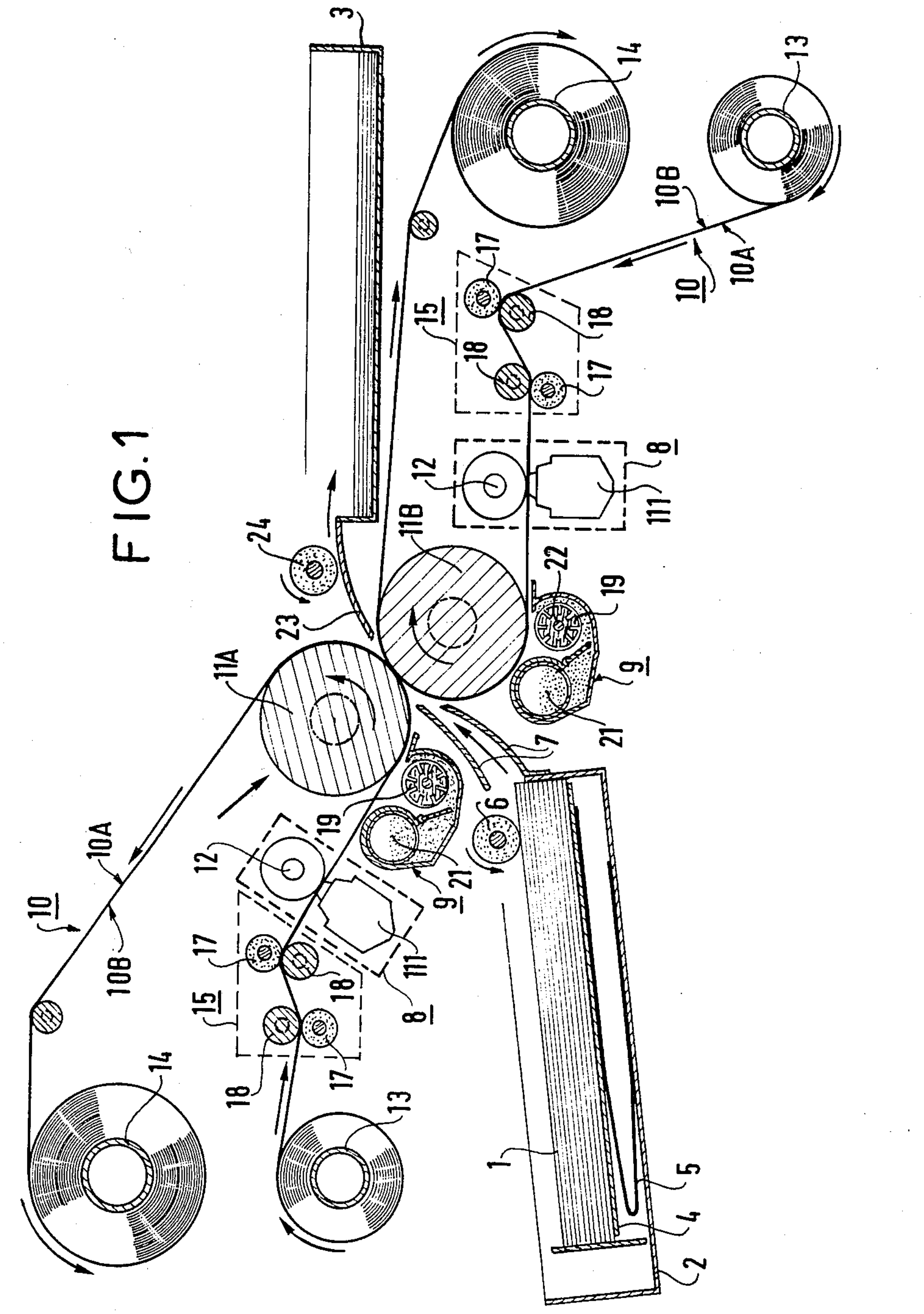
FIG. 1 shows the general structure of a recto-verso indirect electrostatic printer using two intermediate media.
Figure 2:
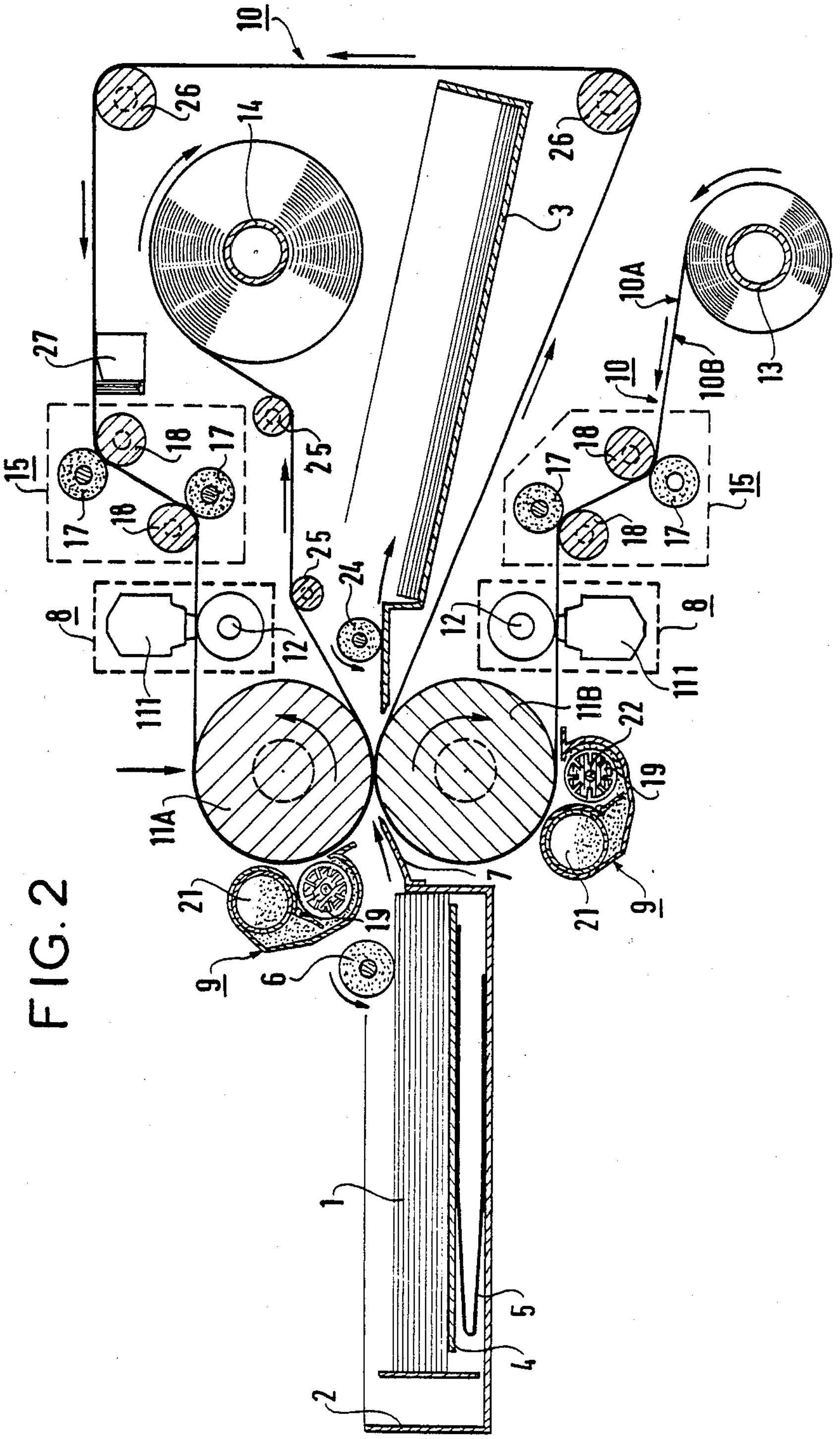
FIG. 2 is a similar view of a recto-verso indirect electrostatic printer using a single intermediate medium.

The indirect electrostatic printer shown in FIG. 1 includes a frame which is not shown in the drawing and which supports the component parts which are shown in the drawing, and it also includes bodywork (likewise not shown) serving to conceal and protect said component parts while still allowing a final recording medium 1 on which printing is to take place to be inserted and to be removed.

Generally speaking, the final recording medium 1 is is paper which may be in roll form, but which is preferably in commercial format sheets because of the considerable convenience offered by paper in this format.

To this end, the printer includes at least one inlet tray 2 for sheets of blank paper and an outlet try 3 for temporarily storing sheets which have been printed on.

The inlet tray 2 is, for example, a conventional removable paper tray suitable for receiving a stack of sheets and including a thrust plate 4 together with a spring 5 for pressing the top of the stack against an un-stacking roll 6 which is fixed to the frame of the printer close to and above an opening in the bodywork through which the leading end of the inlet tray 2 is inserted.

The leading end of the inlet tray is designed to slot mechanically into position inside the printer so that the stack of sheets contained therein has the leading edge of the top sheet pressed against the peiphery of the unstacking roll 6 which is rotated by conventional means when a sheet is to be printed.

The top sheet of the stack is then driven by the unstacking roll 6 out from the open leading end of the inlet tray 2 towards the printing equipment per se via a short guide path 7 constituted by at least one wall fixed to the frame or to the body of the printer.

The printing equipment is essentially constituted by two electrostatic write heads 8, two inking devices 9, a transfer unit 11, and auxiliary equipment for handling the dielectric film 10 which serves as an intermediate recording medium.

Each write head is intended to write a latent electrostatic image progressively on the film 10 by electrostatic discharge between the print electrodes of the head and the counterelectrodes associated therewith.

The print electrodes, and possibly also the counterelectrodes of a head, are fixed and housed in a block of insulating material 111 in which they are aligned with their tips flush with the surface of the block which surface is level with one of the faces 10A of the film 10 running over the block 111 as it runs through the printer during printer operation.

To this end, a cylinder 12 having its axis extending perpendicular to the direction of motion of the film 10 and which is preferably rotatable about said axis is placed in front the block 111 to press the film against the block where the tips of its electrodes are flush with its surface.

Details of one example of a write head which is suitable for the present printer are to be found in published European patent application No. 0 091 973 in which the cylinder 12 of a head constitutes a rotary counterelectrode situated on the opposite side of the intermediate recording medium 10 from the print electrodes which are contained in the block 111. Naturally, other variant write heads may be adapted for use in a printer in accordance with the present invention.

Regardless of the specific write head used, the dielectric film 10 must be disposed in such a manner as to move against the block 111 in a direction which is perpendicular to the direction in which the electrodes are aligned, and this is conventionally done by initially winding the film on a feed shaft 13 and then unwinding film from the feed shaft 13, passing it through the write head 8, and finally winding the film onto to a takeup shaft 14 where it is stored after it has been used.

In the printer shown in FIG. 1, each write head has an individual dielectric film 10 associated therewith and each write head is therefore also associated with corresponding feed and takeup shafts 13 and 14.

Naturally, each write head is located on the path of the dielectric film between the associated feed and takeup shafts 13 and 14, and may optionally be preceded by an electrostatic charge erase head 15 located on the path of the film 10 between the feed shaft 13 and write head 8.

Each erase head 15 includes at least one charge-removal unit for removing electrostatic charge from one of the two faces of a film 10, and preferably comprises one charge-removal unit for each face of the film 10.

In one particular embodiment of an erase head, each of the two charge-removal units comprises a pair of parallel and substantially tangential conductive rolls 17 and 18 which extend transversally relative to the film 10 where it leaves the feed shaft 13 so that each roll in the pair of rolls is pressed across the entire width of a corresponding face of the film. The two rolls 17 and 18 in a single charge-removal unit are subjected to an alternating high tension potential difference, for example to 1500 volts at 1 kHz to 150 kHz.

One of the two rolls in a charge-removal unit is made of hard, metallic, and highly-conductive material, whereas the other roll is preferably made of flexible elastomer or silicone elastomer material impregnated with conductive particles.

The two rolls 17 and 18 in a single charge-removal unit are preferably disposed so as to cause the film 10 bear against a relatively large zone of the hard metallic roll 18 of the pair of rolls.

Naturally, it would be possible, as a variant, to use a conventional corona effect device in a variant embodiment.

An inking device 9 is disposed close to each write head 8 downstream therefrom on the path of the film 10.

Each inking device 9 may comprise, for example, a magnetic brush 19 which constitutes a multi-pole magnet for setting up tufts of a magnetic powder in its field lines, with the powder being taken from a trough which is filled from a removable cartridge 21 placed thereabove.

Each magnetic brush 19 is rotatably mounted about a shaft 22 disposed transversely to the film 10 at the outlet from a write head, with the entire width of the film being pressed at this location against one of the rolls 11A or 11B of the transfer unit 11.

The two rolls 11A and 11B are made of hard, nonmagnetic conductive material, they are driven in rotation, and they are electrically connected to the frame of the printer.

Each magnetic brush 19 is suitable for being rotated by conventional motor means (not shown) so as to come close to a face of film 10 without touching it in a zone where the film is pressed against a roll of the transfer unit 11, and is located on the opposite side of the film to the corresponding transfer roll 11A or 11B. The transfer roll 11A or 11B associated with a magnetic brush 19 is on the same side of the film 10 as the cylinder 12 of the write head 8 whereas the magnetic brush 19 is on the same side as the electrode block 111.

The powder in the magnetic tufts of the rotating magnetic brush 19 is selectively attracted to the electrostatically charged zones of the adjacent face of the film 11, with particles being deposited on the electrostatically charged zones when the electrostatic force is greater than the magnetic force due to the magnet.

The portion of the film 10 which includes an inked zone on its face 10A opposite to its face which is pressed against a corresponding one of the rolls 11A or 11B of the transfer unit 11 remains spread over the corresponding roll 11A or 11B as it passes from the inking device 9 to the pressure contact zone between the two pressure rolls 11A and 11B where they are urged towards each other by a conventional mechanical or hydraulic pressure arrangement (not shown).

Each of the rolls 11A and 11B of the transfer unit 11 which acts as a transfer roll and which has a portion of the film 10 pressed thereagainst for inking and image transfer, also serves as a pressure roll for pressing against the other roll 11B or 11A during the image transferring and fixing stage.

In the printer shown in FIG. 1, the two rolls 11A and 11B which are parallel and which are urged towards one another by the above-mentioned pressure arrangement, pinch two portions of different films 11 which run in parallel and in the same direction between the two rolls 11A and 11B.

During printing, an electronic control unit (not shown) synchronizes the electrostatic write operations of the two write heads so that the inked images on the inking faces 10A of each of the two films 10 press suitably against opposite faces of a sheet of the final medium 1 at corresponding levels as the sheet 1 of the final medium is inserted between the faces 10A of the films where they are driven by the transfer rolls 11A and 11B. The sheets 1 may additionally be driven by auxiliary means, such as the un-stacking roll 6.

The ink carried by the faces 10A of the films is transferred by the pressure from the rolls 11A and 11B onto the front (recto) and back (verso) faces of the final recording medium 1 which is then ejected via an outlet guide 23 to the outlet tray 3 which may be situated outside the printer, and on top of it.

In the example shown, a drive wheel 24 helps extract the final recording medium 1 from the pressure rolls and to convey it towards the outlet tray 3.

If the mere application of pressure is insufficient to fix the ink on the final medium, then the transfer unit may additionally include auxiliary heating means (not shown).

The used portions of the two films 10 each having an inked face are conventionally directed to respective takeup shafts 14 via at least one director roll 25 which is conventionally both rotatable about its own axis and displaceable in order to facilitate the winding of used film on the corresponding takeup shaft regardless of the size of the reel of film which has already been taken up.

In a printer in accordance with the invention, which is more compact than the FIG. 1 printer and which makes full use of the dielectric film 10, means are provided for using both faces of the film for simultaneous recto-verso printing on the final recording medium.

As before, the printer includes at least one preferably removable inlet tray 2 for sheets of final recording medium prior to printing, together with an outlet tray 3 for printed sheets, but it will be understood that these items, and in particular the inlet tray, may be replaced by a system using a reel of final medium, or by a system using continuous fan-fold medium.

As before, the printer includes two write heads 8, two inking devices 9, and a transfer unit 11, all of which are identical or very similar to those described above.

A single dielectric film 10 runs from a feed shaft 13 to a takeup shaft 14, which shafts are parallel to each other and which are both situated on the same side of the transfer unit 11 as constituted by the rolls 11A and 11B.

On leaving the reel on the feed shaft 13, the film 10 passes through a first electrostatic erase head 15 for eliminating any unwanted electrostatic charge which may be present on the film prior to use, then through a first write head 11 where a first electrostatic image is formed on a face 10B of the film as said face runs over the print electrodes housed in the block 111 of the first write head. The film 10 then runs partially around the transfer roll 11 with its opposite face 10A pressed thereagainst while its face 10B which has received the electrostatic image is inked by a first inking device 9 which is on the opposite side of the film than the pressure roll 11B. As the film 10 moves with the transfer or pressure roll 11B, the inked image is moved round towards the other transfer roll 11A so that a zone of the inked face 10B of the film is pressed against a corresponding portion of a sheet of final recording medium 1 between the transfer rolls. The pressure applied by the transfer rolls on the film and the sheet pinched therebetween causes the inked image to be transferred to one of the two faces of the corresponding sheet, for example to its front or recto face.

The film 10 then loops round guide wheels 26, a cleaning unit 27, a second electrostatic erase head 15 and a second write head 8 prior to returning to the said other roll 11A of the transfer unit 11. The cleaning unit 27 removes the ink remaining on the face 10B of the film and may comprise, for example, a plurality of scraper blades for scraping the face 10B which now faces downwards so that the ink particles remaining on the face 10B are removed and collected in a suitable tray (not shown).

After the film has been electrostatically discharged by the second charge-removal head 15, the second write head 8 writes a second electrostatic image on the film 10, or more precisely on the other face 10A of said film, which face then runs round a portion of the roll 11A with its face 10B coming into contact the roll. The second electrostatic image formed on the face 10A is then inked by the second inking device 9 which is placed on the opposite side of the film from the roll 11A. As the film 10 is moved together with the roll 11A this second inked image comes up to the first roll 11B so that the zone of the face 10A of the film on which the second image is inked is pressed against a corresponding portion of the sheet of the final recording medium 1, between the transfer rolls.

Simultaneous recto-verso printing can thus be obtained by a suitable disposition of the write heads 8 and the inking devices 9 relative to the transfer rolls with which they are associated, and by suitably synchronizing the control signals applied to the various components, for example by means of an electronic unit (not shown) for controlling printer operation. This is done by causing two images to be written simultaneously (i.e. the recto and the verso images), and then causing said images to be simultaneously inked, both of which images are intended for a single sheet of final recording medium. Both images are then simultaneously transferred from corresponding portions of the film onto the appropriate sheet, with said images being formed on opposite faces 10A and 10B of a single film of dielectric medium 10. Recto and verso printing takes place simultaneously on the single sheet of the final recording medium.

As before, the printed sheet is ejected by the transfer rolls 11A and 11B which are pressed against one another for printing purpose and which are driven mechanically, and the sheet is guided to the outlet tray 3 by a drive wheel 24.

After passing round each of transfer rolls 11B and then 11A, the film 10 is finally taken up on the takeup shaft 14 to which it is guided by director wheels 25. In the embodiment shown, the takeup shaft 14 is located inside the loop formed by the film 10 as it passes all the way around the transfer roll 11A by passing via director wheels 26, so as to enable its opposite face to be pressed against the other side of the sheet of final recording medium.

Similarly, the outlet tray is located beneath the takeup shaft 14 and inside the large loop, so that the tray is inserted into the printer and removes therefrom sideways, i.e. perpendicularly to the plane of the figure.

I claim:

1. In an electrostatic printer employing a dielectric film as an intermediate recording medium for receiving an electrostatic latent image which is to be printed on a final recording medium, said latent image being received from an electrostatic write head constituted by a set of aligned print electrodes and associated counter-electrodes, said final recording medium being intended to receive the electrostatic latent image after it has been developed by means of an inking device, and said inked image being fixed on said final recording medium by the application of high pressure with said intermediate and final recording media being pressed against each other in a transfer unit by means of pressure transfer rolls with said intermediate and final media passing simultaneously therebetween after the intermediate recording medium has been inked, the improvement wherein; said final recording medium is pressed between two portions of a single dielectric film passing successively over each of the two rolls of the transfer unit with a different face of the intermediate medium being pressed against each of said rolls, thereby enabling two different zones on opposite faces of the dielectric film to simultaneously receive respective electrostatic latent images and to be simultaneously inked, with said inked images being simultaneously transferred to the recto and verso faces of a common final recording medium from two portions of the dielectric film which are situated at a distance apart from each other along said film and which are situated on opposite faces thereof, each of said two portions being suitable for being electrostatically charged by a write head attributed thereto and inked by an inking device likewise attributed thereto, and each of said inking devices being associated with a different one of the transfer rolls of the transfer unit.

2. An electrostatic printer according to claim 1, wherein the dielectric film is stored on two parallel-axis shafts, with one of said shafts being housed inside a loop formed by the film around one of the rolls of the transfer unit after passing between the rolls of said units.

3. An electrostatic printer according to claim 2, characterized in that both dielectric film-carrying shafts are situated on the same side of the rolls of the transfer units.

4. An electrostatic printer according to claim 1, including an inking device associated with each of the rolls of the transfer unit with each of said inking devices being preceded on the path taken by the dielectric film from a feed shaft to a takeup shaft by a corresponding electrostatic write head and a corresponding electrostatic erase head for removing electrostatic charge from the dielectric film prior to having an electrostatic image written thereon and prior to said image being inked.

* * * * *